(12) United States Patent
Hamaoka

(10) Patent No.: US 7,725,897 B2
(45) Date of Patent: May 25, 2010

(54) SYSTEMS AND METHODS FOR PERFORMING REAL-TIME PROCESSING USING MULTIPLE PROCESSORS

(75) Inventor: Yoshiyuki Hamaoka, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 1582 days.

(21) Appl. No.: 10/997,550

(22) Filed: Nov. 24, 2004

(65) Prior Publication Data

US 2006/0112390 A1    May 25, 2006

(51) Int. Cl.
*G06F 9/46* (2006.01)
(52) U.S. Cl. ....................... 718/102; 718/100
(58) Field of Classification Search ......... 709/201–203, 709/223–226; 718/100–108
See application file for complete search history.

(56) References Cited

U.S. PATENT DOCUMENTS

| | | | | | |
|---|---|---|---|---|---|
| 5,109,512 | A * | 4/1992 | Bahr et al. | ............... | 718/103 |
| 5,202,987 | A * | 4/1993 | Bayer et al. | ............... | 718/102 |
| 6,246,720 | B1 * | 6/2001 | Kutner et al. | ............. | 375/240.25 |
| 6,985,937 | B1 * | 1/2006 | Keshav et al. | ............... | 709/223 |
| 7,165,252 | B1 * | 1/2007 | Xu | ............... | 718/102 |
| 7,359,324 | B1 * | 4/2008 | Ouellette et al. | ............ | 370/230 |
| 2002/0099759 | A1 * | 7/2002 | Gootherts | ............... | 709/105 |
| 2002/0198923 | A1 * | 12/2002 | Hayes, Jr. | ............... | 709/102 |
| 2003/0200250 | A1 * | 10/2003 | Kiick | ............... | 709/102 |
| 2005/0102677 | A1 * | 5/2005 | Gootherts | ............... | 718/105 |

FOREIGN PATENT DOCUMENTS

| | | |
|---|---|---|
| JP | 09-237256 | 9/1997 |
| JP | 9-274583 | 8/1999 |
| JP | 2001-22595 | 1/2001 |
| JP | 2004-78322 | 3/2004 |

OTHER PUBLICATIONS

Baruah, S.K, et al. "Scheduling for Overload in Real-Time Systems", IEEE Transactions on Computers, vol. 46, Issue 9, Sep. 1997, pp. 1034-1039.*

* cited by examiner

*Primary Examiner*—Meng-Ai An
*Assistant Examiner*—Gregory A Kessler
(74) *Attorney, Agent, or Firm*—Law Offices of Mark L. Berrier

(57) ABSTRACT

Systems and methods for increasing utilization of processors in a multiprocessor system by defining a strict real-time schedule and a pseudo-real-time schedule and dynamically switching between the strict real-time schedule and the pseudo-real-time schedule for execution of tasks on the processors. In one embodiment, a number of occupied entries in an output buffer is monitored. When the number meets or exceeds a first threshold, the pseudo-real-time schedule is implemented. When the number is less than or equal to a second threshold, the strict real-time schedule is implemented. In one embodiment, the pseudo-real-time schedule is determined using an asymptotic estimation algorithm, in which the schedules for multiple processors are merged and then load-balanced (potentially multiple times) to produce a schedule that uses less processing resources than the strict real-time schedule.

20 Claims, 9 Drawing Sheets

Operation-parallel:

Data-parallel:

SYSTEMS AND METHODS FOR PERFORMING REAL-TIME PROCESSING USING MULTIPLE PROCESSORS

BACKGROUND

1. Field of the Invention

The invention relates generally to computer systems and more particularly to systems and methods for scheduling the processing of tasks in a multiprocessor system to enable real-time processing of data with improved utilization of processing resources.

2. Related Art

As the development of computers and computer-related technologies has advanced, applications for these technologies have advanced at an equally rapid pace. Applications for computer technologies take advantage of increases in processing speed and computational power, and drive the demand for additional increases. The demand for increased speed and power is sometimes met by simply providing additional resources and, and other times, by making the existing resources more efficient.

One of the approaches that is used to provide more computational power is to provide multiple processors in a computer system. By making more processors available to perform the various tasks of a given application, and by having the processors perform the different tasks in parallel, the application can be executed more quickly than if the tasks of the application had to be performed serially by a single processor having comparable processing power.

It is, however, typically more difficult to process the tasks of an application in parallel than to process these tasks serially. Traditionally, applications (computer programs) have been constructed in a serial fashion. In other words, the application consists of a series of program instructions that are executed one after the other. In many instances, one task (e.g., a program instruction or series of instructions) must be completed so that the result of the task can be used for another task. The application is therefore typically serial in nature. There may, however, be some tasks that are independent of each other and can therefore be performed in parallel.

It is often a very complicated and difficult undertaking to determine how the various tasks within an application can be distributed among multiple processors so that the tasks can, to the extent possible, be performed in parallel. As noted above, one of the complications involves determining which tasks are independent of each other and can therefore be performed in parallel. Another complication is that some of the tasks may have processing constraints that may or may not be capable of being satisfied if the tasks are processed in a parallel fashion. For instance, some tasks may be critical to the application and the overall performance of the application may not be acceptable if these tasks are delayed (e.g., in scheduling the tasks for parallel execution.)

One example of a situation in which there are constraints on the execution of tasks within an application is the case in which the application is intended to perform real-time processing of data, such as video data. It is important in the processing of encoded video data that the decoding and presentation of the data to a user (in the form of a video display) be performed in real-time. In other words, the data for the video frames, which represent a video image that has an inherent, real-time speed, must be processed quickly enough that the video image can be presented to the user as a continuous stream at this real-time speed. If there are delays in processing, the video data stream presented to the user will be interrupted, causing interruptions or artifacts in the displayed video. Such interruptions or artifacts are unacceptable, so it is critical to provide real-time processing of the encoded video data.

In order to process data such as encoded video in real-time, the processors in a multiprocessor computing system are scheduled to handle the various processing tasks that are required. The scheduling of these tasks is typically performed in one of two ways—statically, or dynamically. Each of these approaches has its own advantages and disadvantages.

The static scheduling of tasks generally consists of determining the specific tasks that have to be performed and then determining a schedule for execution of these tasks by the different processors, such that the scheduled tasks can be performed in real-time, even in a worst-case scenario. Once this schedule is determined, it is fixed and does not change once processing of the data has begun. The advantages of static scheduling approaches are that they are relatively easy to implement, they are predictable, and they are scalable. The primary disadvantage of static scheduling approaches is that they may have lower utilization of the processors than dynamic approaches.

The dynamic scheduling of tasks generally consists of identifying a processor that is not busy, and assigning the next task to be performed to that processor. In other words, each processor is assigned a corresponding task and, when a particular processor completes its assigned task, a new task is assigned to that processor for execution. The advantage of using a dynamic approach is that utilization of the processors is typically higher than for a static scheduling method. The disadvantages of dynamic scheduling methods is that they are typically more difficult to implement than static scheduling methods, they are not as predictable as static methods (e.g., in terms of dispatch time, rescheduling time, etc.,) and today generally are not easily scalable.

SUMMARY OF THE INVENTION

One or more of the problems outlined above may be solved by the various embodiments of the invention. Broadly speaking, the invention comprises systems and methods for increasing utilization of processors in a multiprocessor system by defining a strict real-time schedule and a pseudo-real-time schedule and dynamically switching between the strict real-time schedule and the pseudo-real-time schedule for execution of tasks on the processors. In one embodiment, a number of occupied entries in an output buffer is monitored. When the number meets or exceeds a first threshold, the pseudo-real-time schedule is implemented. When the number is less than or equal to a second threshold, the strict real-time schedule is implemented. In one embodiment, the pseudo-real-time schedule is determined using an asymptotic estimation algorithm, in which the schedules for multiple processors are merged and then load-balanced (potentially multiple times) to produce a schedule that uses less processing resources than the strict real-time schedule.

One embodiment comprises a method implemented in a multiprocessor computing system for performing real-time processing of data. The method includes providing a strict real-time schedule and a pseudo-real-time schedule for performing a set of tasks on a plurality of processors in a multiprocessor computing system, evaluating a prevailing set of operating conditions, and alternately selecting the strict real-time schedule or the pseudo-real-time schedule based on the evaluation of the prevailing set of operating conditions. The processors in the system then perform the set of tasks according to the selected schedule. In one embodiment, the operating conditions include the number of occupied entries in an output buffer. If the number of occupied entries in the output buffer is less than a first threshold, the strict real-time schedule is selected. If the number of occupied entries in the output buffer is greater than a second threshold, the pseudo-real-time schedule is selected. In one embodiment, the pseudo-real-time schedule is dynamically selected using an asymptotic estimation algorithm. In this embodiment, one or more successive modifications are made to the strict real-time schedule. The modifications may include merging or load-balancing schedules of tasks to be performed by two or more processors. After each modification, it is determined whether the modified schedule has acceptable pseudo-real-time performance by evaluating execution of the scheduled tasks on redundant or non-redundant data. If the performance is acceptable, the modified schedule may be used as the pseudo-real-time schedule.

An alternative embodiment comprises a system including a plurality of processors and a schedule manager coupled to the plurality of processors. The schedule manager is configured to determine real-time progress of data processing performed by the processors and to select either a strict real-time schedule or a pseudo-real-time schedule based on the real-time progress of the processing. The processors then perform the set of data processing tasks according to the selected schedule.

Another alternative embodiment comprises a software program product comprising a computer-readable storage medium that contains one or more instructions configured to cause a computer to perform a method as described above. The computer-readable storage medium may include any of a number of storage media, such as RAM, ROM, flash memory, EPROM memory, EEPROM memory, registers, hard disks, removable disks, CD-ROMs, optical media and so on. The instructions contained in the storage medium may be executable by any type of data processor, and are not limited to instructions executable by personal or general purpose computers.

Numerous additional embodiments are also possible.

The various embodiments of the invention may provide advantages of full static scheduling, such as the guaranteed real-time processing of data, with advantages of full dynamic scheduling, such as improved utilization of processing resources.

BRIEF DESCRIPTION OF THE DRAWINGS

Other objects and advantages of the invention may become apparent upon reading the following detailed description and upon reference to the accompanying drawings.

Figure 1:
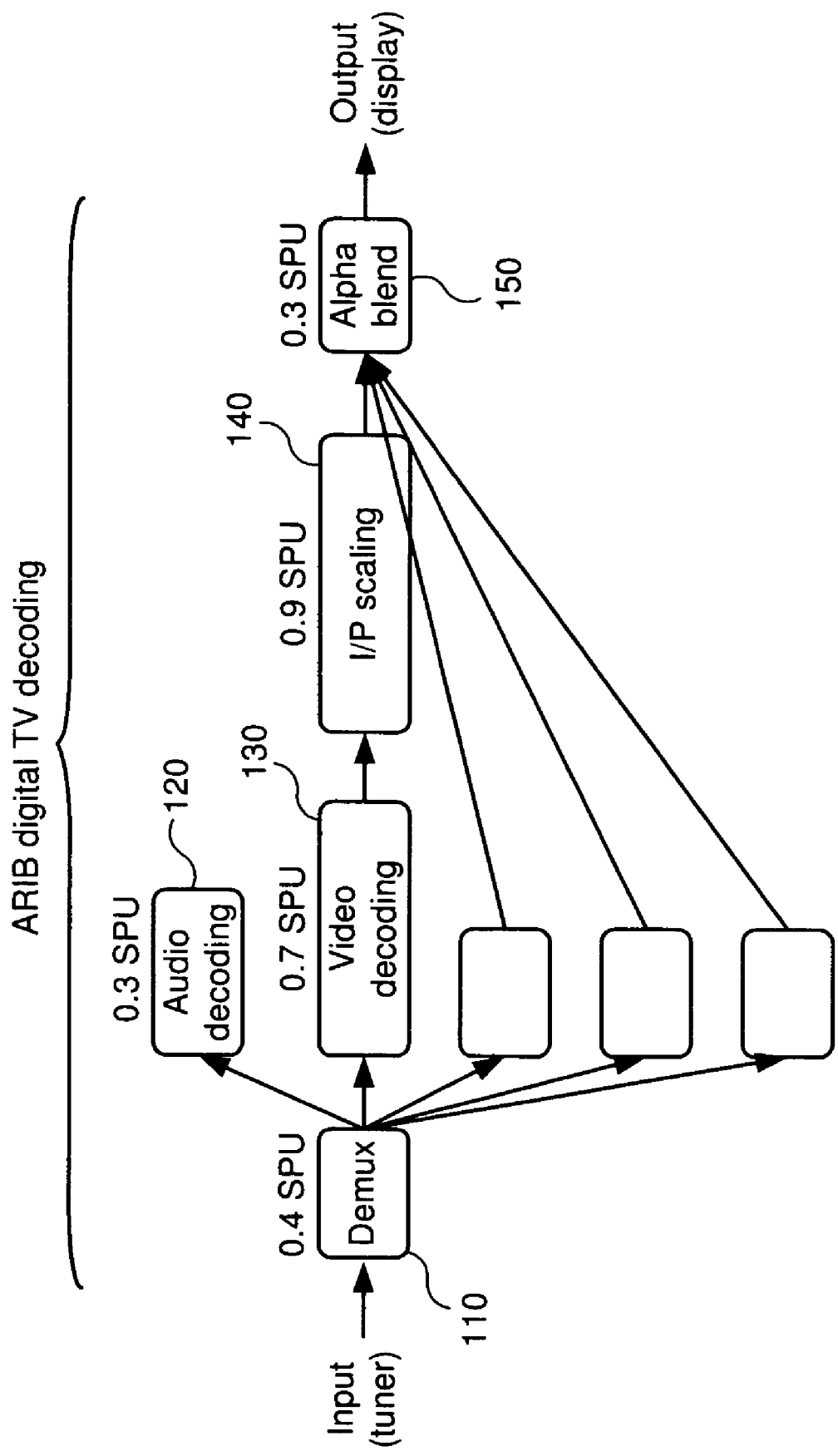
FIG. 1 is an exemplary task graph illustrating the different tasks that must be performed in processing digital television data.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for increasing utilization of processors in a multiprocessor system by defining a strict real-time schedule and a pseudo-real-time schedule and dynamically switching between the strict real-time schedule and the pseudo-real-time schedule for execution of tasks on the processors. In one embodiment, a number of occupied entries in an output buffer is monitored. When the number meets or exceeds a first threshold, the pseudo-real-time schedule is implemented. When the number is less than or equal to a second threshold, the strict real-time schedule is implemented. In one embodiment, the pseudo-real-time schedule is determined using an asymptotic estimation algorithm, in which the schedules for multiple processors are merged and then load-balanced (potentially multiple times) to produce a schedule that uses less processing resources than the strict real-time schedule.

One embodiment is a method for increasing utilization of processors in a multiprocessor system by defining a strict real-time schedule and a pseudo-real-time schedule and dynamically switching between the strict real-time schedule and the pseudo-real-time schedule for execution of tasks on the processors. In this embodiment, the selection of the strict or pseudo-real-time schedules is progress-based. In other words, if the processing of data has progressed at a rate greater than real-time, enough data has been processed to allow the system to use the pseudo-real-time schedule. If the pseudo-real-time schedule breaks, there is enough processed data to allow the system to switch back to the strict real-time schedule, which is guaranteed to perform real-time processing of the data.

In one embodiment, the progress of the data processing is determined by monitoring the number of occupied entries in an output buffer. When the number meets or exceeds a first threshold, the pseudo-real-time schedule is implemented. When the number is less than or equal to a second threshold, the strict real-time schedule is implemented. In one embodiment, the pseudo-real-time schedule is determined dynamically using an asymptotic estimation algorithm, in which the schedules for multiple processors are merged and then load-balanced (potentially multiple times) to produce a schedule that uses less processing resources than the strict real-time schedule. Thus, the strict real-time schedule remains static, but the pseudo-real-time schedule may be periodically modified.

As pointed out above, prior art methods for scheduling real-time tasks on processors in a multiprocessor computing system have various advantages and disadvantages. One or more embodiments of the present invention are intended to provide advantages of both static and dynamic scheduling methods, while eliminating one or more of the corresponding disadvantages of these methods. In one embodiment, it is desired to provide a means for scheduling tasks on the multiple processors using a static worst-case schedule that can, from time to time, be replaced with an optimized schedule that better utilizes the available processors. This scheduling means is self-controlled, relatively easily implemented, predictable, scalable and has improved efficiency with respect to utilization of the processors.

Before describing the details of the various embodiments, it will be useful to describe the processing tasks and the information available as the basis for scheduling decisions. This discussion will use the processing of video data according to the ARIB digital television decoding model as an example of the real-time processing to be performed by the multiprocessor system. (ARIB is the Association of Radio Industries and Businesses—a Japanese standards organization.) It should be noted that this particular type of processing is only one example of the many different types of real-time processing that may be performed using embodiments of the present invention.

Referring to FIG. 1, a task graph illustrating the different tasks that must be performed in processing the digital television data is shown. In this figure, data is first received from a digital television tuner. The first task in the processing is the demultiplexing of the data (110.) This separates the digital television data into its different component parts. Each of the components of the digital television data can then be appropriately processed. For example, encoded audio data undergoes audio decoding (120,) encoded video data undergoes video decoding (130,) and so on. After the video data is decoded, the data undergoes I/P scaling (140.) Finally, alpha blending is performed on the different components of the digital television data to generate output video data that is suitable to drive a display. The displayed television data (image) can then be viewed by a user.

The task graph describes the constraints between the different tasks that have to be performed in the processing of the digital television data. For example, before any of the data can be decoded, it must be demultiplexed (110.) With respect to the video data, the data must then be decoded (130) and I/P scaled (140) before it can be combined with the other data components in the alpha blend task (150.)

Another constraint that is not explicit in the task graph of FIG. 1 is the real-time constraint. In order to drive a continuous television image to the video display, it is necessary to process the data at a rate which is high enough to maintain this continuous stream of television imagery. For example, if the digital television data is being provided at a rate of 60 frames per second, and is intended to be displayed at a rate of 60 frames per second, the tasks must be performed at a rate which provides at least 60 frames per second. (Because the output data may be buffered, the rate at which the data is processed may be an average rate, rather than an instantaneous rate.)

As mentioned above, one approach to perform the tasks included in the processing of the digital television data would be to dynamically schedule each successive task to the next available processor. Since each processor could begin performing the next task upon completion of the previous task, this dynamic scheduling method can have very high processor utilization.

[For the purposes of this disclosure, "full dynamic scheduling" refers to scheduling methods of this type, in which the tasks performed by the processors are scheduled to be executed on particular processors "on-the-fly" rather than being scheduled before the processors become available.]

The conventional alternative to dynamic scheduling methods are the static scheduling methods mentioned above. Because the embodiments of the invention described herein are based on predetermined schedules similar to the schedules used in conventional static scheduling methods, static scheduling will be described in detail in the following paragraphs. For the purposes of this disclosure, "full static scheduling," as used below, refers to scheduling methods in which the schedules used to determine which tasks will be executed by which processors remain completely static or unchanged. In contrast to these full static scheduling methods, the embodiments of the invention allow one schedule to be switched with another, or to be modified, in order to obtain better utilization of the processors.

Figure 2:
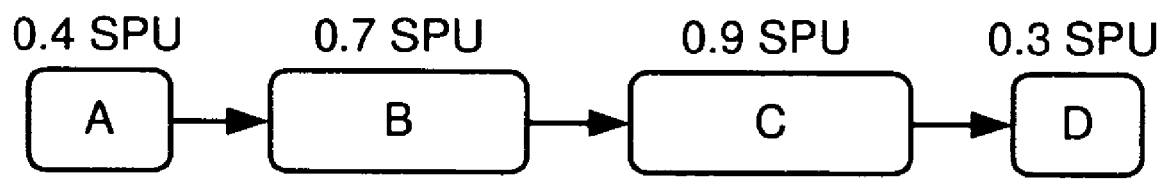
FIG. 2 is a diagram illustrating a set of tasks that are performed in the processing of video data in one embodiment.

Referring to FIG. 2, a figure illustrating a set of tasks to be performed in the processing of video data by a particular application is shown. FIG. 2 depicts four tasks that are defined within the application for the processing of video data: A; B; C; and D. Data received by the application is processed according to task A, then according to task B, then according to task C, and finally according to task D. For a given piece of input data, tasks A-D are performed in this specific order. It is assumed that the input data consists of a stream of pieces of data, each of which is processed in this manner. For the purposes of the following discussion, these pieces of input data will be referred to as frames of data.

It should be noted that this terminology should not be construed as limiting the input data to those types which are normally formatted in "frames" (e.g., video data,) but is simply used here for convenience in referencing blocks of data that are processed by a particular set of related tasks.

FIG. 2 shows a number of processing cycles that are required to complete each task in a worst-case scenario. In this example, tasks A-D are shown to require 0.4, 0.7, 0.9 and 0.3 cycles, respectively, in the worst-case. While each of these tasks may actually require fewer cycles to complete in the processing of a particular frame of input data, it is necessary to determine the number of cycles in the worst-case because, in a full static scheduling method, the scheduled execution of the tasks cannot be changed. As a result, if a schedule can only accommodate a certain number of cycles of processing time (e.g., 0.5) for a particular task, but that task sometimes requires more (e.g., 0.6) cycles, the task can no longer be processed in real time. If the schedule cannot guarantee real-time processing of the data, it will be "broken" in the worst-case scenario.

Based upon the worst-case numbers shown in FIG. 2, 2.3 processing cycles are required to complete all four tasks. Each of the tasks, however, must be completed within a single cycle. At first glance, it may therefore appear that four cycles are necessary to complete these tasks because the tasks must be completed in order, and because neither A and B, nor B and C, nor C and D can be combined in a single cycle. Task D can, however, be combined in a single cycle with task A as performed on a subsequent frame of data, so that only three processing cycles are required. Thus, in a series of successive cycles, the following tasks can be performed: B1; C1; D1+A2; B2; C2; D2+A3; . . . (where the subscript denotes the frame of input data upon which the task is being performed.)

While the processing of a frame of input information may require three cycles, it may be necessary to have a higher throughput than one frame per three cycles. Higher throughput is obtained by using multiple processors to process the stream of input data. For example, if a one-frame-per-cycle throughput is desired, three processors can be used. If higher throughput is desired, additional processors can be assigned to process the stream of input data.

Figure 3:
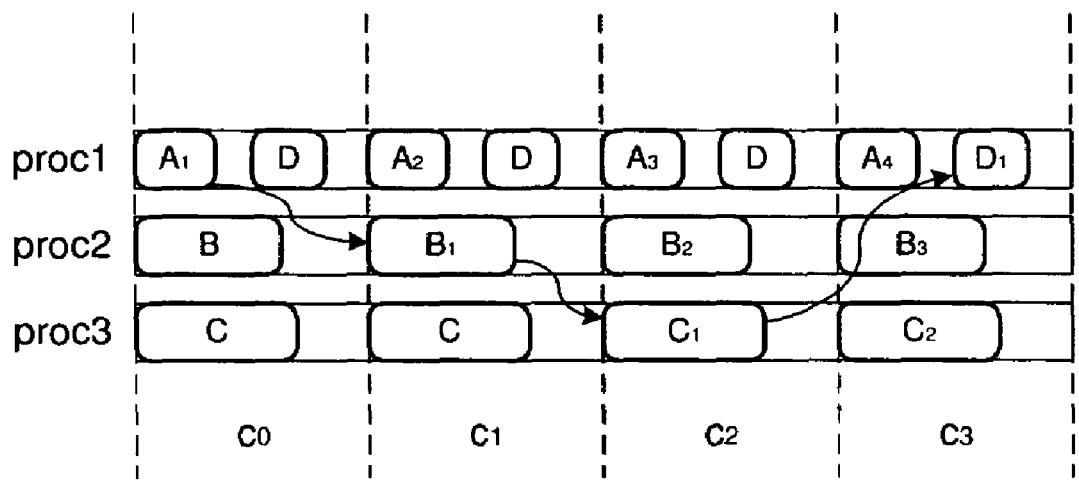
FIG. 3 is a diagram illustrating operation-parallel and data-parallel static scheduling structures in accordance with one embodiment.
Figure 3:
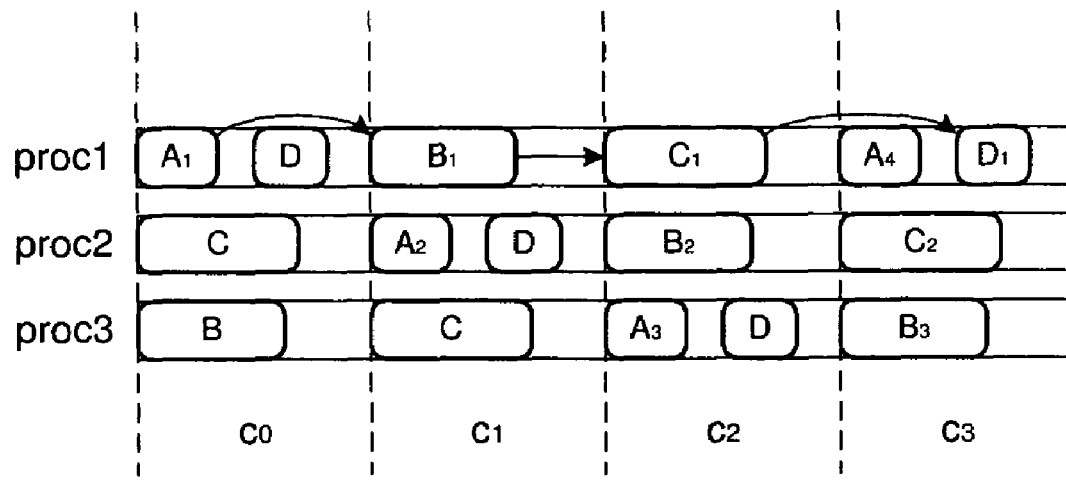

When multiple processors are used to process a stream of input data, the processing tasks are typically assigned to the processors in one of two ways: using an operation-parallel scheduling structure; or a data-parallel scheduling structure. These structures are illustrated in FIG. 3. The upper portion of FIG. 3 illustrates an operation-parallel structure, while the lower portion of the figure illustrates a data-parallel structure.

In both the operation-parallel structure and the data-parallel structure, task A (for a first frame of data) and task D (for a second frame of data) are processed by a single processor in a single frame, while tasks B and C are each processed individually. In the case of the operation-parallel scheduling structure, the different tasks (operations) that are performed on each frame of data are performed by parallel (different) processors. Thus, a single frame of data will be partially processed by multiple processors. In the case of the data-parallel scheduling structure, the different tasks (operations) that are performed on each frame of data are performed by the same processor. Consequently, a single frame of data will be entirely processed by a single processor. At the same time this first frame of data is being processed by the first processor, one or more additional frames will be processed by different processors in parallel with the first frame.

Referring again to the example of FIG. 3, each frame of input data undergoes processing consisting of tasks A, B, C and D. The particular frame that is being processed by each task in the figure is indicated by the subscript of the task. For example, "A1" indicates that task A is being performed on frame 1. The arrows in the figure show the successive tasks that are performed in relation to a given frame of data. In other words, there are arrows from task An to task Bn, from task Bn to task Cn, and from task Cn to task Dn.

In the operation-parallel scheduling structure in the upper portion of the figure, it can be seen that, for input frame 1, task A is performed by processor 1. Task B is then performed by processor 2. After task B is completed, task C is performed by processor 3. Finally, task D for frame 1 is performed by processor 1. For each of the input frames, the same tasks are performed by the same processors. In other words, tasks A, B, C and D are performed by processors 1, 2, 3 and 1, respectively. Each processor therefore performs the same task(s) for every one of the input frames, and no processor performs all of the tasks for any one of the input frames.

In the data-parallel scheduling structure in the lower portion of FIG. 3, it can be seen that tasks A-D for input frame 1 are all performed by processor 1. Each of the tasks is performed in a successive cycle, with task A (for a first frame) being performed in the same cycle as task D (for a different frame.) Thus, each data frame is processed entirely by a single processor.

These operation-parallel and data-parallel scheduling structures are both strict real-time structures. That is, both structures ensure real-time processing of the input data. Regardless of whether the operation-parallel or the data-parallel scheduling structure is used, however, it can be seen that the tasks that must be performed in processing the input data frames use only a portion of the available processing resources. As pointed out above, in the worst-case, tasks A-D use 0.4, 0.7, 0.9 and 0.3 processing cycles, respectively. Thus, while three cycles are required to schedule the tasks, only 2.3 cycles are actually used in performing the tasks. This is a utilization of only about 77% of the available capacity of the processors. The utilization is even less in the more typical case. For example, if tasks A-D typically only use 0.4, 0.7, 0.2 and 0.3 cycles, respectively, the utilization of the processors is only about 53% (1.6/3.)

Figure 4:
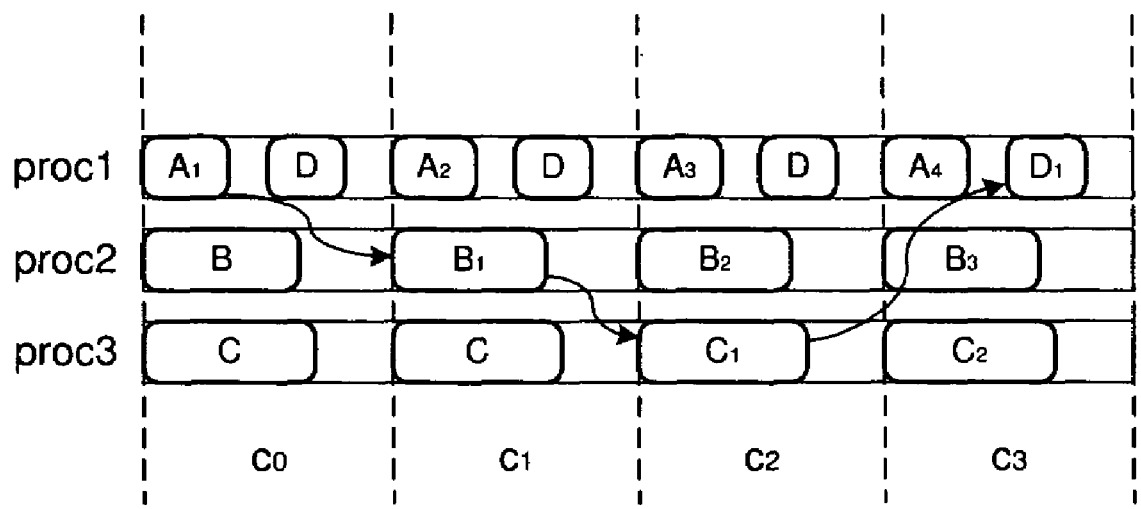
FIG. 4 is a diagram illustrating static scheduling structures for worst-case and typical-case scenarios in one embodiment.
Figure 4:
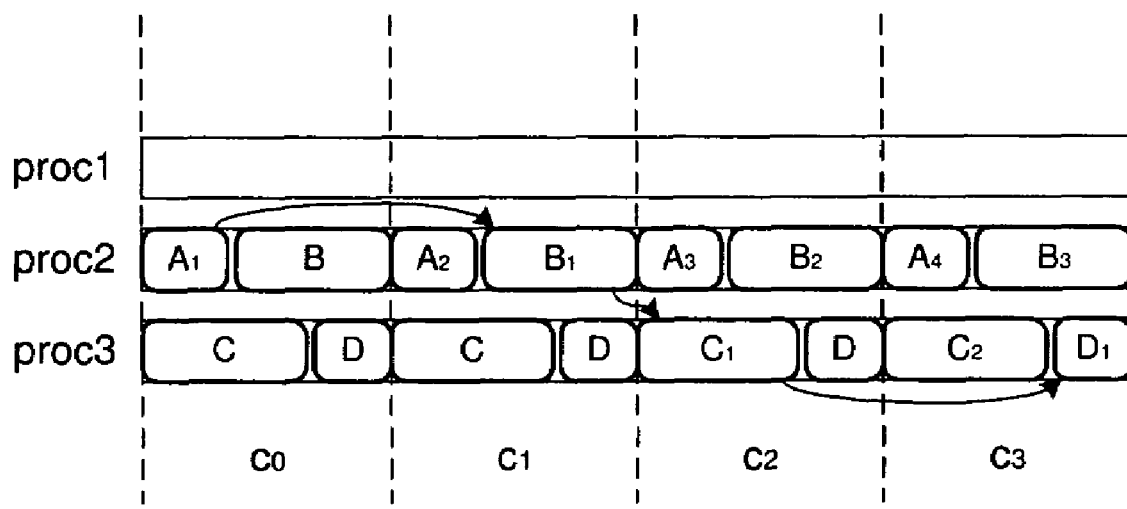

The typical-case scenario is illustrated graphically in FIG. 4. The upper portion of this figure shows the tasks scheduled using a strict real-time schedule (corresponding to the upper, operation-parallel portion of FIG. 3.) Because task C requires only 0.2 cycles instead of 0.9 cycles, processor 3 becomes severely underutilized. It should be noted that it would be possible to perform all four of these tasks in two cycles. For example, tasks A and D could be performed in one cycle, while tasks B and C could be performed in another cycle. This optimized, two-cycle (two-processor) schedule is shown in the lower portion of FIG. 4.

It should be noted that, "two-cycle" and "three-cycle" refer to the use of two and three processor cycles, respectively, to process a single input frame of data. These two or three processor cycles may be executed by a single processor, or by multiple processors. In either instance, the same amount of data is processed by two processors implementing a two-cycle schedule and by three processors implementing a three-cycle schedule.

While the optimized, two-cycle schedule clearly provides better utilization of the processors, conventional static scheduling approaches do not allow the schedule to be modified. Either the three-cycle schedule or the two-cycle schedule would be used exclusively. As noted above, the three-cycle schedule is a strict real-time schedule and, while not very efficiently utilizing the processors, this schedule does guarantee real-time processing of the input data. The two-cycle schedule, while sufficient for the typical case (and possibly most cases,) would be broken in the worst case (because tasks B and C together would require 0.7+0.9=1.6 cycles.) The two-cycle schedule may therefore be referred to as a pseudo-real-time schedule.

The present embodiments therefore use a combination of strict real-time and pseudo-real-time schedules. These schedules are used alternately so that the efficiency of the pseudo-real-time schedule is obtained when the typical-case scenario is encountered, but the guaranteed real-time processing of the strict real-time schedule is provided when the worst-case scenario is encountered.

The decision as to whether the strict real-time schedule or the pseudo real-time schedule should be used is based upon the progress that is being made in processing the input data. In one embodiment, the progress of the system in processing the input data is determined by the amount of processed data that is stored in an output buffer. The output buffer temporarily stores data that has been processed until the data is forwarded to a display device for presentation to a user.

The output buffer is used to store the processed data because the data may not be processed at exactly the same rate at which it is needed by the display device. When the data is being processed at a higher rate than it is being used by the display device, data is accumulated in the output buffer. When the data is being processed at a lower rate than it is being used by the display device, data is depleted from the output buffer. Thus, the short-term data throughput can vary, as long as the long-term throughput is high enough to supply the display device with a continuous stream of processed data.

In one embodiment, the amount of data in the output buffer is monitored and compared to one or more threshold levels. If the amount of data in output buffer is higher than a first threshold, the processing system has made sufficient progress to allow a pseudo real-time schedule to be used. In other words, there is enough data in the output buffer that, even if the pseudo real-time schedule breaks (cannot process data in real-time,) data can continue to be supplied from an output buffer to the display device without interruption for some period of time. This allows the processing system to recover, either by processing data at a higher rate using the pseudo real-time schedule or by switching to the strict real-time schedule, which is guaranteed to processed data at a rate which is at least as great as the rate at which data is provided to the display device.

Figure 5:
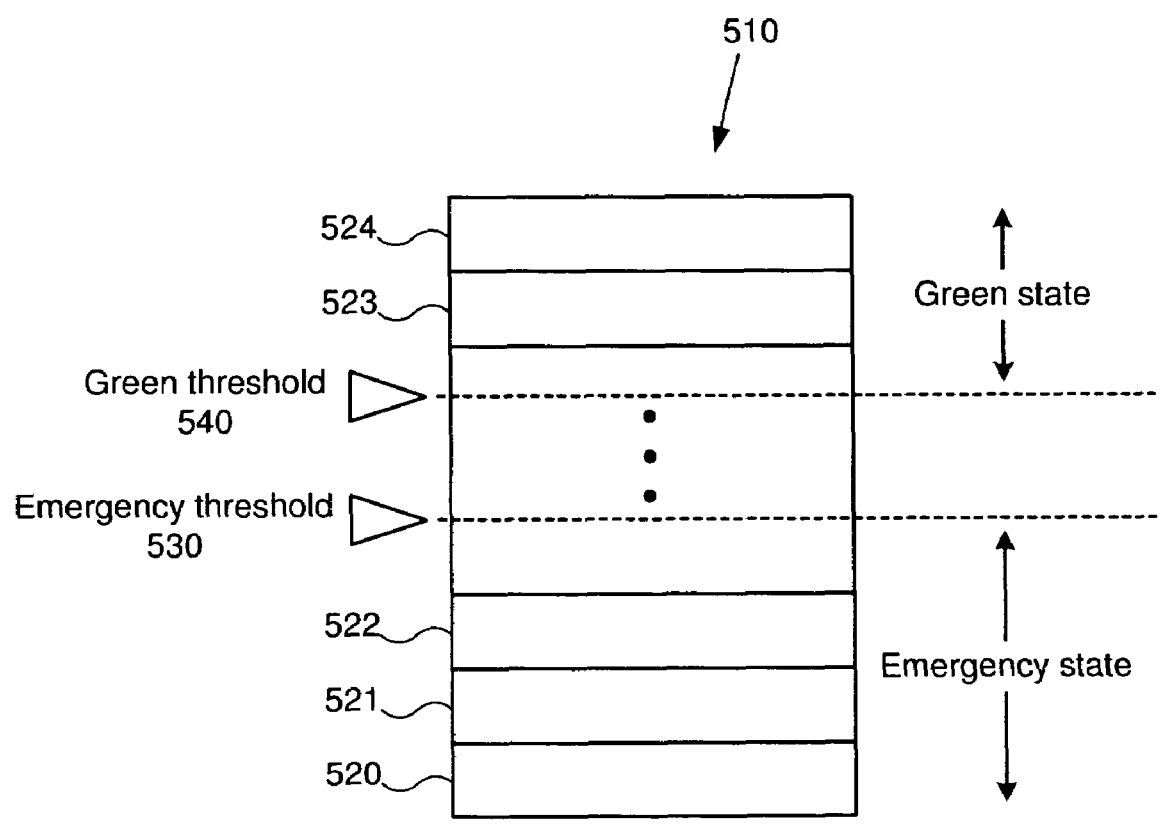
FIG. 5 is a diagram illustrating the structure of an output buffer and corresponding thresholds defining Green and Emergency states in accordance with one embodiment.

Referring to FIG. 5, a diagram illustrating an output buffer in an exemplary embodiment is shown. FIG. 5 depicts an output buffer 510 that has a plurality of entries 520-524. In this particular embodiment, there are n entries. Buffer 510 is a FIFO (first-in, first-out) buffer, so data is removed from the buffer in the same order that the data was stored in the buffer. It should be noted that the buffer entries depicted in the figure do not correspond to particular storage locations in the buffer, but are instead intended to illustrate the number of occupied entries in the buffer. Lowest buffer entry 520 may therefore be considered to correspond to the entry at the head of the buffer, while the highest occupied buffer entry may be considered to correspond to the entry at the tail of the buffer.

Buffer 510 is therefore filled, for the purposes of this description, from the bottom to the top (i.e., beginning with buffer entry 520 and using as many of the successive buffer entries as necessary.) Thus, if output data fills three entries in buffer 510, the occupied entries are entries 520-522. If there is data in n−1 entries, the occupied entries are entries 520-523 (keeping in mind that there may be additional entries between entries 522 and 523.)

As depicted in the figure, there is a first threshold 530 and a second threshold 540. In this embodiment, the two thresholds correspond to different levels (numbers of entries) in buffer 510, although the two thresholds could be set at the same level. First threshold 530 is identified in FIG. 5 as an "Emergency" threshold. If the number of occupied entries in the buffer is less than Emergency threshold 530, the system is considered to be in an Emergency state. This simply means that the system must take steps to ensure that data is processed at a rate sufficient to meet the real-time requirements for processing the data. In other words, the system must ensure that there is not a buffer underflow (i.e., no data in the buffer) that would cause an interruption in the stream of output data that is provided from the buffer to a display device.

Second threshold 540 is identified in the figure as a "Green" threshold. If the number of occupied entries in the buffer is greater than Green threshold 540, the system is considered to be in a Green state. This means that there is enough data in the buffer that the system does not have to ensure real-time processing of data for some number of subsequent cycles. That is, there are enough entries in output buffer to continue to provide data from the output buffer to the display device in real-time for some number of cycles, even if new entries are not stored in the buffer in real-time.

Threshold 530 and 540 therefore define states in which the strict real-time and pseudo-real-time processing schedules can and/or must be used. More specifically, if the system is in the Emergency state (the number of entries in buffer 510 is less than Emergency threshold 530,) the strict real-time schedule must be used because there are not enough entries in the buffer to provide continuous output data to the display if these buffer entries are not replaced in real-time. If, on the other hand, the system is in the Green state (the number entries in buffer 510 is greater than Green threshold 540,) there are enough entries that data can be provided from the buffer to the display device in real-time, even if the buffer entries are not replaced in real-time. This, of course, cannot continue indefinitely, and if the number of entries in the buffer falls below the Emergency threshold, the system will then be in the Emergency state and it will be necessary employ the strict real-time schedule to ensure that there is not a buffer underrun.

It should be noted that the thresholds in alternative embodiments need not be different. Further, the states of the system may change when the numbers of occupied entries in the output buffer are greater/less than or equal to the respective thresholds.

Figure 6:
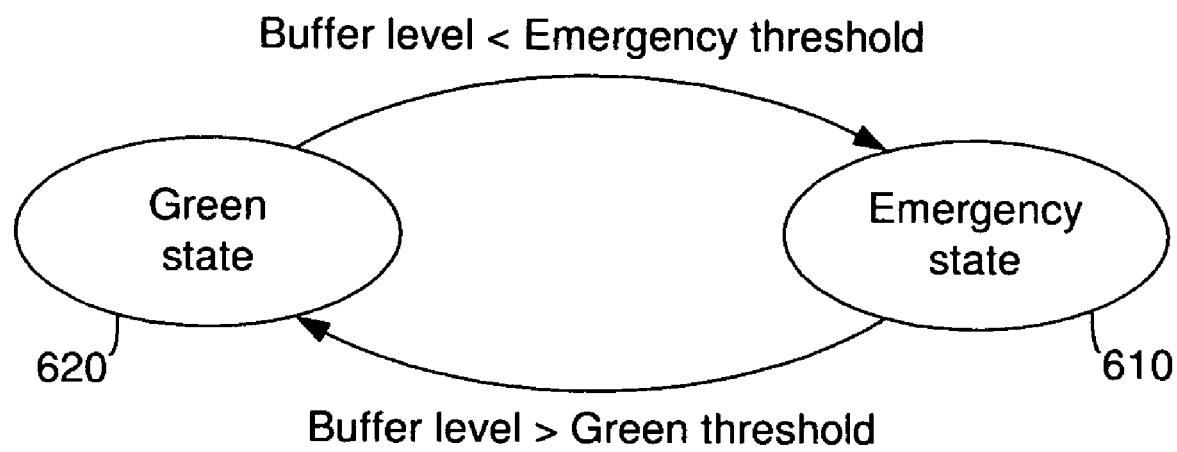
FIG. 6 is a state diagram illustrating Green and Emergency states and the transitions between these states in accordance with one embodiment.

Referring to FIG. 6, a state diagram illustrating the Green and Emergency states and the transitions between these states is shown. In one embodiment, the system will begin in the Emergency state (610) because no data has yet been processed and stored in the output buffer. In the Emergency state, the system will process data according to the strict real-time schedule. As data is processed, entries are stored in the buffer. If the data is processed at a rate greater than the real-time rate at which data is removed from the buffer and provided to the display device, data will accumulate in the buffer and the number of occupied entries will increase. When the number of occupied entries in the buffer exceeds the Green threshold, the system transitions to the Green state (620).

When the system enters the Green state, it begins to use the pseudo-real-time schedule to process data. The pseudo-real-time schedule is configured to allow most of the data to be processed in real-time. To the extent that data is, in fact, processed in real-time, the level of occupied entries in the buffer will be maintained, or even increased. As noted above, however, the pseudo-real-time schedule will break in some cases (e.g., the worst-case.) When this occurs, new buffer entries are not stored as quickly as older entries are removed from the buffer, and the number of occupied entries in the buffer will decrease. If the number of occupied buffer entries falls below the Emergency threshold, the system will return to the Emergency state, in which the strict real-time schedule will be used to process the data.

Figure 7:
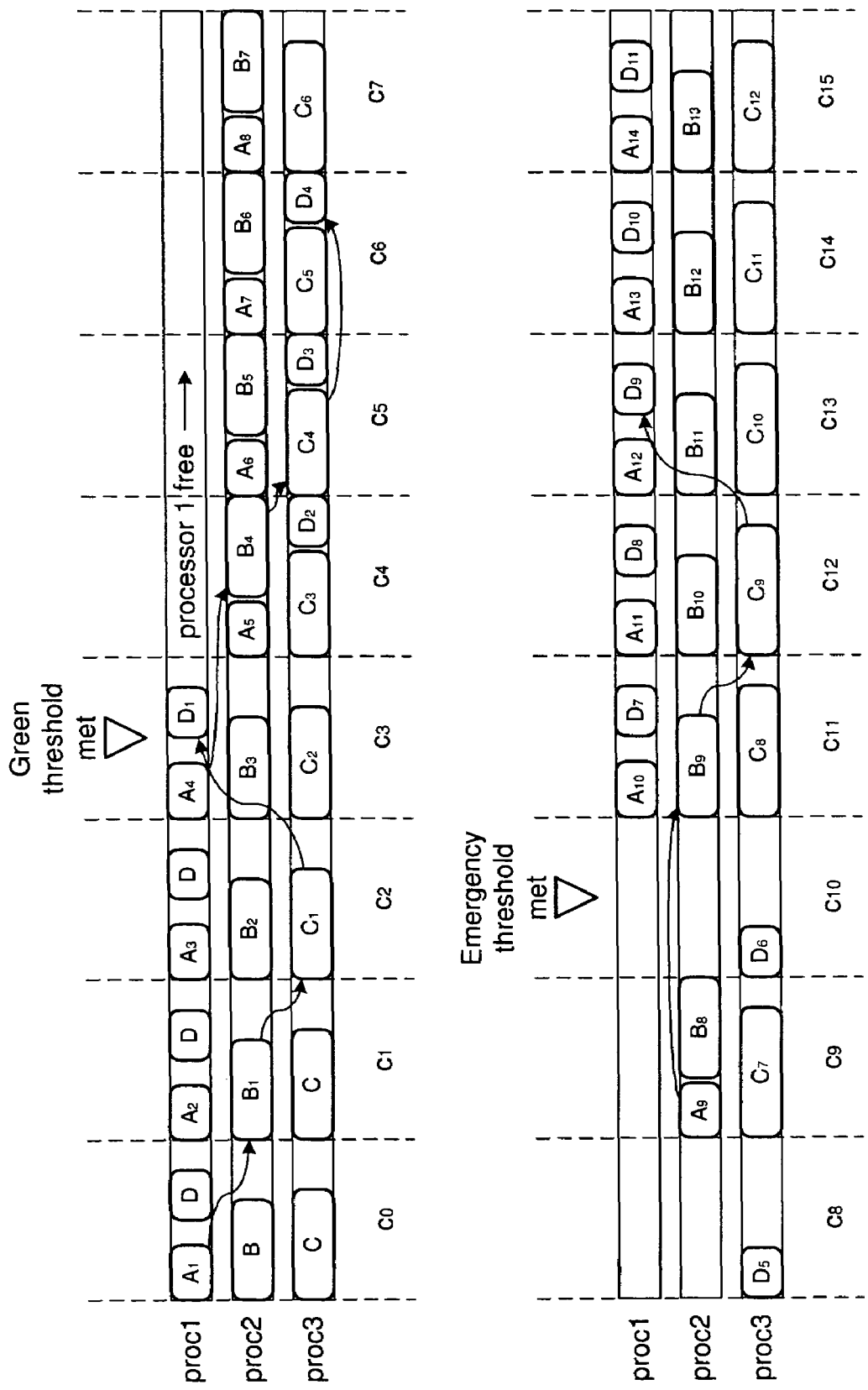
FIG. 7 is a diagram illustrating an exemplary scenario in which a system switches between strict real-time and pseudo-real-time processing schedules in accordance with one embodiment.

Referring to FIG. 7, a diagram illustrating an exemplary scenario in which a system switches between strict real-time and pseudo-real-time processing schedules in accordance with one embodiment is shown. In this example, input data is processed in the same manner described above. That is, tasks A-D are performed on each input data frame, and the resulting data is stored in an output buffer before being forwarded to a display device.

It can be seen in FIG. 7 that the input data is initially processed by three processors in the multiprocessor system. In this instance, the processors are using a data-parallel, strict real-time schedule. Processor 1 therefore performs task A for a first frame of input data and task D for an earlier frame of input data in the same cycle (c0.) In the next cycle, c1, processor 1 performs task B for the first frame of data. In cycle c2, processor 1 performs task C for the first frame of data. Finally, in cycle c3, processor 1 performs task D for the first frame of data (as well as task A for a later frame of data.) Processors 2 and 3 perform the same tasks for successive frames of input data.

During cycle c3, it is determined that the number of occupied entries in output buffer is greater than the Green threshold. Consequently, the system switches from the strict real-time schedule used during cycles c0-c3 to a pseudo-real-time schedule. This pseudo-real-time schedule uses only two of the processors to perform tasks A-D. In particular, each processor performs tasks A and B in a single cycle and tasks C and D in a single cycle. It should be noted that this particular pseudo-real-time schedule was in this example because the time required to perform tasks A and B are small enough to be combined in a single cycle. The same is true of tasks C and D. If this were not true, a different pseudo-real-time schedule might be implemented.

While the pseudo real-time schedule implemented beginning at cycle c4 initially processes the input data in real-time, the amount of time required to perform the individual tasks may change so that the schedule no longer provides for real-time processing of the data. For example, as shown beginning at cycle c7 of FIG. 7, the amount of processing time required to perform task C has increased, so that tasks C and D can no longer be performed in a single cycle. Consequently, task C6 is performed by processor 3 in cycle c7, and task D5 is performed by processor 3 in cycle c8. This holds true for the subsequent frames of data as well. Because the pseudo real-time schedule can no longer process the data in real-time, the number of occupied entries in the output buffer decreases.

During cycle c10, the number of occupied entries in the output buffer falls below the Emergency threshold, and it is determined that the system is in the Emergency state. As a result, the system switches from the pseudo real-time schedule back to the strict real-time schedule. This is the same strict real-time schedule that was initially used by the system (at cycle c0.) Thus, processor 1 performs tasks A and D, while processor 2 performs task B and processor 3 performs task C. The strict real-time schedule continues to be used until the output buffer again has a number of occupied entries exceeding the Green threshold.

It should be noted that any suitable strict real-time and/or pseudo-real-time schedules may be used, as the described schedules are merely exemplary. It should also be noted that, while the specific example of FIG. 7 shows that there is no delay in switching between the strict real-time schedule and the pseudo-real-time schedule, some embodiments may experience delays in switching schedules.

The strict real-time processing schedule discussed above may be determined in any manner conventionally used to perform static scheduling of real-time tasks. In one embodiment, the strict real-time schedule is determined by examining the constraints on the tasks to be performed, such as the order in which the tasks must be performed, the real-time requirements of the processing, and so on. In some cases, it may be helpful to use a task graph to identify the processing constraints. The strict real-time schedule can then be constructed based upon the worst-case processing scenario.

Because the pseudo-real-time processing schedule does not have to guarantee that all of the processing constraints, such as real-time processing of the data, will always be met, this schedule can be selected to make better use of the available processing resources in typical, non-worst-case scenarios. There are many possible bases for selecting a particular pseudo-real-time schedule, and many algorithms for actually determining this schedule. In one embodiment, an asymptotic estimation method is used to determine the pseudo-real-time schedule.

The asymptotic estimation method used in this embodiment involves the selection of possible pseudo-real-time schedules and evaluation of the schedules with respect to their real-time processing performance. If the performance of a particular schedule is determined to be sufficient, that schedule may be actually implemented as the pseudo-real-time alternative to the strict real-time schedule.

In one embodiment, a candidate pseudo-real-time schedule is selected by merging the schedules of two of the currently scheduled processors, evaluating the resulting schedule, and then load-balancing the schedule if necessary to improve the schedule's real-time performance. This methodology is illustrated in the exemplary scenario of FIG. 8.

Figure 8:
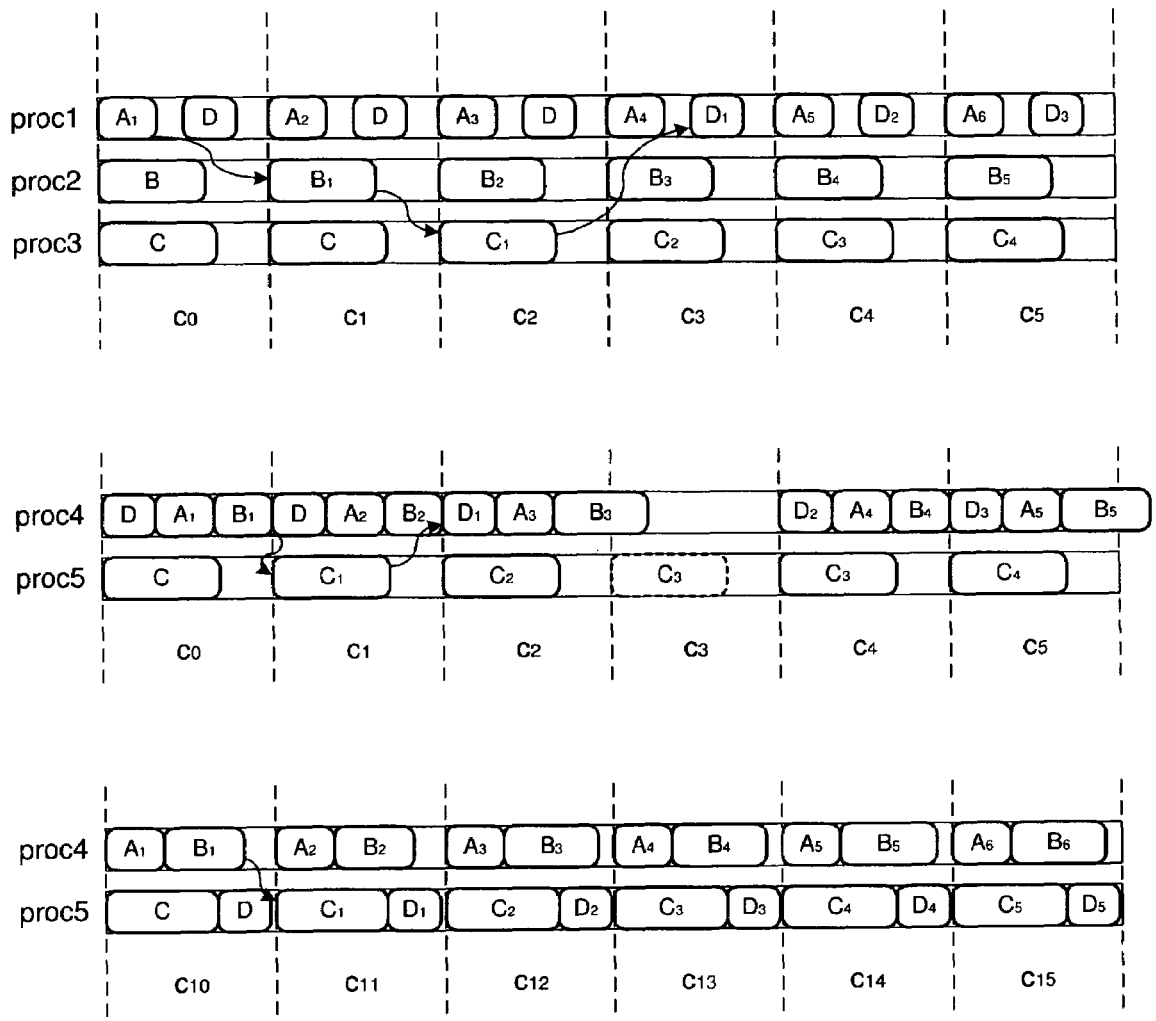
FIG. 8 is a diagram illustrating the modification of a strict real-time schedule using an asymptotic algorithm to achieve a pseudo-real-time schedule having acceptable real-time performance in accordance with one embodiment.

Referring to FIG. 8, a diagram illustrating the modification of a strict real-time schedule to achieve a pseudo-real-time schedule having acceptable real-time performance is shown. This figure shows three schedules. At the top of the figure is a strict real-time schedule as described above in connection with, for example, FIG. 3. The schedule in the middle of FIG. 8 is a first modified schedule based on the strict real-time schedule at the top of the figure. The schedule at the bottom of FIG. 8 is a second modified schedule based on the first modified schedule in the middle of the figure.

The strict real-time schedule at the top of FIG. 8 uses three processors (processor 1, processor 2 and processor 3.) In the typical-case scenario, the strict real-time schedule has only about 50% utilization of processor 1 (which performs tasks A and D,) about 60% utilization of processor 2 (which performs task B) and about 70% utilization of processor 3 (which performs task C.)

The initial candidate for the pseudo-real-time schedule is formed by combining the tasks of two of the processors. In the example of FIG. 8, the scheduled tasks of processors 1 and 2 are combined and executed on processor 4. The tasks scheduled on processor 3 are performed by processor 5. As shown in the figure, the tasks scheduled for each cycle are completed as scheduled in cycles c1, c2 and c5, but are not completed as scheduled in cycles c3 and c6. The failure rate for the candidate schedule (based on these and additional cycles) is determined to be 33%, which is, in this embodiment, unacceptable.

Because the first candidate schedule does not provide acceptable performance, the tasks of this schedule are load-balanced to produce a new candidate schedule, as shown at the bottom of the figure. In this candidate schedule, processor 4 performs tasks A and B, while processor 5 performs tasks C and D. Based on the illustrated cycles (c1-c6) and additional cycles, this schedule is determined to fail (not complete the scheduled tasks) only 1% of the time. In this embodiment, this performance is determined to be acceptable. This schedule can therefore be implemented when the system is in the Green state, as discussed above.

While the candidate schedule shown at the bottom of FIG. 8 resulted from only two steps (i.e., the merger of the schedules for processors 1 and 2, and the load-balancing from processor 4 to processor 5,) it is possible for these steps to repeated a number of times. The generation of an optimized candidate schedule may also be an ongoing process, so that a pseudo-real-time schedule adapted to the prevailing data and/or processing conditions is continually being reevaluated.

It should be noted that, in the embodiment described above in connection with FIG. 8, the candidate pseudo-real-time schedule is evaluated by actually processing data on a pair of available processors using the candidate schedule. The data may be either redundant (i.e., the same data that is being processed by processors 1-3,) or non-redundant data. The real-time performance of the candidate schedule may alternatively be evaluated by determining the amount of processing resources (number of cycles) needed by processors 1-3 to perform tasks A-D, and then computing the number of cycles needed by the candidate schedule to perform the tasks.

It should also be noted that the asymptotic schedule selection method discussed above is exemplary. Many other methods may be used in alternative embodiments to select suitable pseudo-real-time schedules for use when the corresponding system is in a Green state. Similarly, the method described above for using buffer thresholds as indicators as to when the system enters Green or Emergency (or equivalent) states is merely illustrative of the various methods that may be used to measure the progress of the data processing performed by the system. Other methods for measuring the processing progress of the system may be used in alternative embodiments.

It should further be noted that, while the pseudo-real-time schedule described above in connection with FIG. 8 utilizes fewer processors than the strict real-time schedule, this is not necessarily the case in alternative embodiments. It may be possible in these embodiments to implement pseudo-real-time schedules on the same number of processors that are used by the strict real-time schedule, but to perform additional tasks on the processors.

Figure 9:
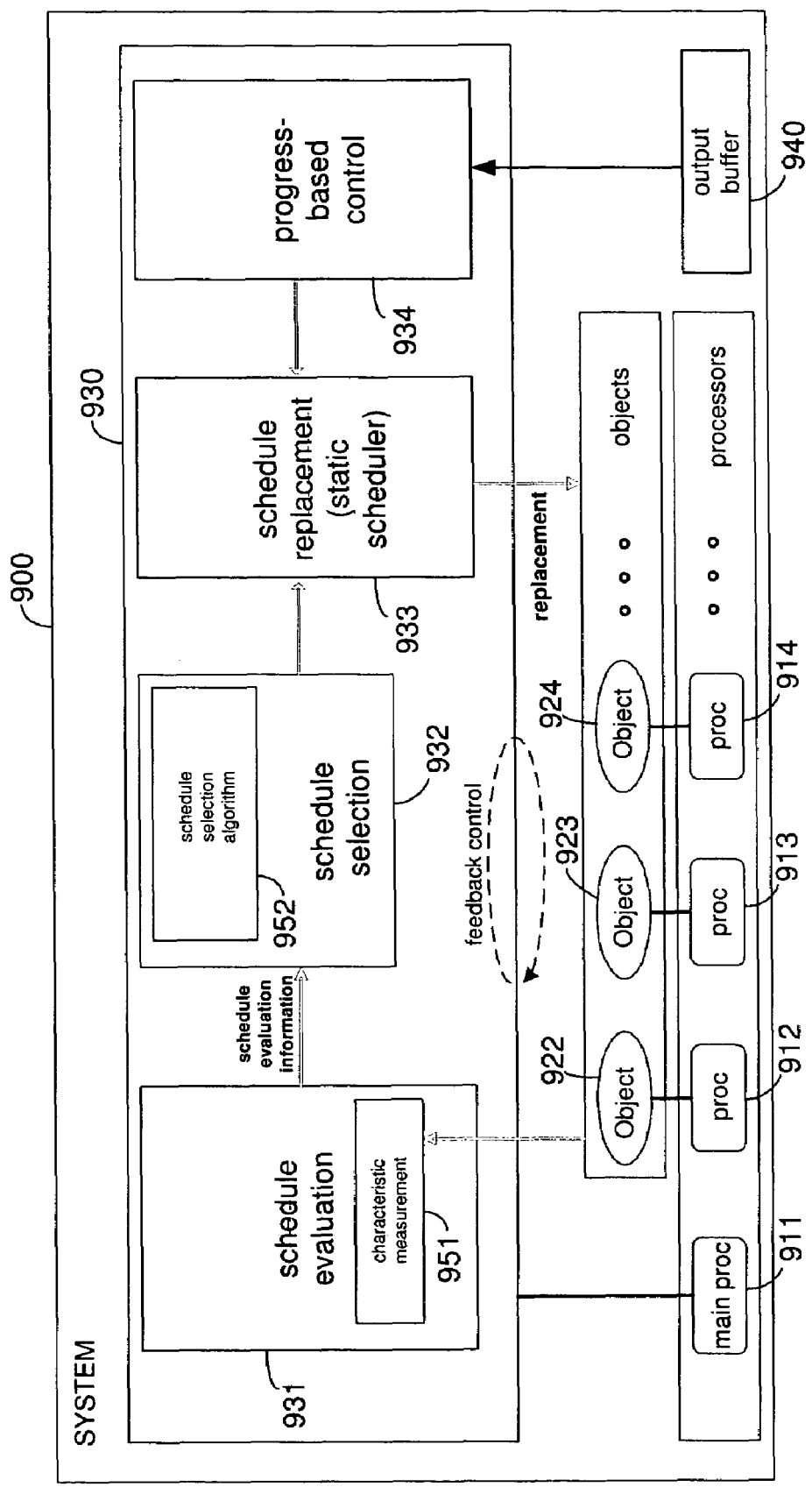
FIG. 9 is a diagram illustrating the structure of a multiprocessor system in accordance with one embodiment.

The progress-based task scheduling methods described above may be implemented in a variety of multiprocessing system topologies. Referring to FIG. 9, a diagram illustrating an exemplary embodiment of a multiprocessor system in which the methods described above can be implemented is shown. In this figure, multiprocessor system 900 includes a plurality of individual processors 911-914, as in other multiprocessor systems. Each of processors 912-914 is configured to use a corresponding one of configuration objects 922-924. Processor 911 may also use a corresponding configuration object, but this is not necessarily the case. The configuration objects provide the programming that enables the processors to perform the appropriate tasks (e.g., tasks A-d described above.)

In this embodiment, processor 911 is a primary processor that is used to perform management functions within system 900. For example, primary processor 911 is configured in this embodiment to run schedule manager Schedule manager 930 performs the schedule evaluation, modification (e.g., merging and load-balancing) and replacement, as well as the data processing progress monitoring and state control described above. Schedule manager 930 operates based on progress information (e.g., buffer level) received from output buffer 940, as well as task execution information (e.g., number of cycles used to perform tasks) from processors 911-914 and configuration objects 922-924.

Within schedule manager 930, schedule evaluation component 931 receives the task execution information from processors 911-914 and configuration objects 922-924. Schedule evaluation component 931 provides schedule evaluation information indicating the performance of the schedules (e.g., percentage of cycles in which a schedule fails) to a schedule selection component 932. Schedule selection component 932 implements schedule selection programming 952 to generate a pseudo-real-time schedule for use in the Green state. This schedule is provided to schedule replacement component 933, which actually performs the replacement of the schedules used by processors 911-914 and configuration objects 922-924. The replacement of the schedules is based on input received from progress-based control means 934, which is in turn based on the number of occupied entries in output buffer 940.

Those of skill will appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of methods described in connection with the embodiments disclosed herein may be embodied directly in hardware, in software (program instructions) executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such the processor can read information from, and write information to, the storage medium. In the alternative, the storage medium may be integral to the processor. The processor and the storage medium may reside, for example, in an ASIC. The ASIC may reside in a user terminal. The processor and the storage medium may alternatively reside as discrete components in a user terminal or other device.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A method for performing real-time processing of data comprising:

providing a strict real-time schedule for performing a set of tasks on a plurality of processors in a multi-processor computing system;

providing a pseudo-real-time schedule for performing the set of tasks on one or more of the plurality of processors, wherein the pseudo-real-time schedule provides real-time execution of the set of tasks in a typical case but does not guarantee real-time execution of the set of tasks in a worst case;

evaluating a prevailing set of operating conditions;

alternately selecting the strict real-time schedule or the pseudo-real-time schedule based on the evaluation of the prevailing set of operating conditions; and performing the set of tasks on one or more of the plurality of processors according to the selected schedule;

wherein the pseudo-real-time schedule is dynamically selected by making one or more successive modifications of the strict real-time schedule and determining after each modification whether the modified schedule has acceptable pseudo-real-time performance.

2. The method of claim 1, wherein the operating conditions comprise a number of occupied entries in an output buffer.

3. The method of claim 2, further comprising selecting the strict real-time schedule when the number of occupied entries in the output buffer is less than a first threshold.

4. The method of claim 2, further comprising selecting the pseudo-real-time schedule when the number of occupied entries in the output buffer is greater than a second threshold.

5. The method of claim 1, wherein the pseudo-real-time schedule is selected using an asymptotic algorithm.

6. The method of claim 1, wherein making one or more successive modifications of the strict real-time schedule comprises merging schedules of tasks to be performed by two or more processors.

7. The method of claim 1, wherein making one or more successive modifications of the strict real-time schedule comprises load-balancing schedules of tasks to be performed by two or more processors.

8. The method of claim 1, wherein determining after each modification whether the modified schedule has acceptable pseudo-real-time performance comprises evaluating real-time performance of the modified schedule in processing redundant data.

9. The method of claim 1, wherein determining after each modification whether the modified schedule has acceptable pseudo-real-time performance comprises evaluating real-time performance of the modified schedule in processing non-redundant data.

10. A system comprising:

a plurality of processors; and a schedule manager coupled to the plurality of processors;

wherein the schedule manager is configured to determine real-time progress of data processing performed by the plurality of processors, and select either a strict real-time schedule or a pseudo-real-time schedule based on the real-time progress of data processing performed by the plurality of processors, wherein the pseudo-real-time schedule provides real-time execution of the set of tasks in a typical case but does not guarantee real-time execution of the data processing in a worst case, use a static strict real-time schedule, and dynamically determine the pseudo-real-time schedule by making one or more successive modifications of the strict real-time schedule and determining after each modification whether the modified schedule has acceptable pseudo-real-time performance; and wherein the plurality of processors are configured to perform a set of data processing tasks according to the selected schedule.

11. The system of claim 10, further comprising an output buffer configured to temporarily store data processed by the plurality of processors and to provide the processed data to an output device in real-time.

12. The system of claim 11, wherein the schedule manager is configured to determine the real-time progress of data processing performed by the plurality of processors by determining a number of occupied entries in the output buffer.

13. The system of claim 12, wherein the schedule manager is configured to select either the strict real-time schedule or the pseudo-real-time schedule based on the number of occupied entries in the output buffer.

14. The system of claim 13, wherein the schedule manager is configured to select the strict real-time schedule when the number of occupied entries in the output buffer is less than a first threshold.

15. The system of claim 13, wherein the schedule manager is configured to select the pseudo-real-time schedule when the number of occupied entries in the output buffer is greater than a second threshold.

16. The system of claim 10, wherein the one or more successive modifications of the strict real-time schedule include merging schedules of tasks to be performed by two or more processors.

17. The system of claim 10, wherein the one or more successive modifications of the strict real-time schedule include load-balancing schedules of tasks to be performed by two or more processors.

18. The system of claim 10, wherein the schedule manager is configured to determine whether the modified schedule has acceptable pseudo-real-time performance by processing redundant data.

19. The system of claim 10, wherein the schedule manager is configured to determine whether the modified schedule has acceptable pseudo-real-time performance by processing non-redundant data.

20. A software program product comprising a computer-readable storage medium that contains one or more instructions that are executable by a computer to cause the computer to perform the method comprising:

providing a strict real-time schedule for performing a set of tasks on a plurality of processors in a multi-processor computing system;

providing a pseudo-real-time schedule for performing the set of tasks on one or more of the plurality of processors, wherein the pseudo-real-time schedule provides real-time execution of the set of tasks in a typical case but does not guarantee real-time execution of the set of tasks in a worst case;

evaluating a prevailing set of operating conditions;

alternately selecting the strict real-time schedule or the pseudo-real-time schedule based on the evaluation of the prevailing set of operating conditions; and performing the set of tasks on one or more of the plurality of processors according to the selected schedule;

wherein the pseudo-real-time schedule is dynamically selected by making one or more successive modifications of the strict real-time schedule and determining after each modification whether the modified schedule has acceptable pseudo-real-time performance.

* * * * *